Dec. 13, 1966 M. H. BOLDT ET AL 3,291,487

PHONOGRAPH

Filed March 31, 1964 3 Sheets-Sheet 1

INVENTORS
Melvin H. Boldt
Richard A. Hathaway
By John J. Pederson
Atty.

INVENTORS
Melvin H. Boldt
Richard A. Hathaway
By John J. Pederson
Atty.

INVENTORS
Melvin H. Boldt
Richard A. Hathaway
By John J. Pederson Atty.

United States Patent Office 3,291,487

Patented Dec. 13, 1966

3,291,487

PHONOGRAPH

Melvin H. Boldt, Glenview, and Richard A. Hathaway, Des Plaines, Ill., assignors to Zenith Radio Corporation, Chicago, Ill., a corporation of Delaware Filed Mar. 31, 1964, Ser. No. 356,107
4 Claims. (Cl. 274—2)

The present invention is directed to phonographs. Although of general applicability to phonographs of all types, the invention is of special advantage in portable phonographs and other phonographs in which compactness and component protection are principal objectives.

With the increased demand for higher fidelity and better quality phonographs, it has become increasingly important to provide sufficient protection for the delicate playing components during storage or transportation. In high fidelity portable phonographs it is especially important to provide for such protection. An additional problem of increased importance in portable phonographs is what conversion from the storage configuration to the playing configuration and vice versa must be simply and easily accomplished.

For many uses it is desirable to have the phonograph cabinet of minimal dimensions to reduce the space occupied and to decrease the size and weight of the housing required. Recent efforts in this direction have led to the evolution of the "fold-out" portable phonographs incorporating an automatic record changer mounted for pivotal retraction to a vertical storage position. A disadvantage of this particular type of machine is that the record changing mechanism when in the playing position is accessible from only one side of the phonograph, and access to the spindle for record loading is partially obstructed by the overhanging top of the changer compartment. An additional disadvantage of existing phonographs, especially those in which the record changing mechanism recedes or folds into the phonograph cabinet, is that the movable components, if left unsecured during transportation from one location to another, may be damaged or may damage the cabinet or other components.

Accordingly, it is a principal object of the invention to provide a new and improved phonograph.

It is a further object of the invention to provide a phonograph which avoids one or more limitations of previous constructions.

It is a further object of the invention to provide a phonograph with novel and improved storage provisions for the playing components of the phonograph.

It is still a further object of the invention to provide a phonograph with a new and improved more compact housing which allows the playing components of the phonograph to be stored deep within the housing for protection and yet allows them to be easily accessible when the phonograph is in use.

It is another object of the invention to provide a phonograph which is both simple to operate and economical to manufacture.

In accordance with the invention, a phonograph having a record playing mechanism for developing an audio signal from a record disc and apparatus for processing the audio signal to reproduce the sound recorded on the disc comprises a cabinet having a main portion for housing the audio signal processing apparatus. The main cabinet portion is provided with a recess at the top. There is an auxiliary cabinet portion which carries the record playing mechanism and is pivotally affixed to the main cabinet portion for rotation within the recess between a first position in which the record playing mechanism is upwardly presented for playing of the record disc, and a second position in which the record playing mechanism is stored upside down within the recess of the main cabinet portion. In addition, means are provided responsive to the rotation of the auxiliary cabinet portion from the first position to the second position for captivating the turntable and tone arm when the auxiliary cabinet portion is in the second position.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2:
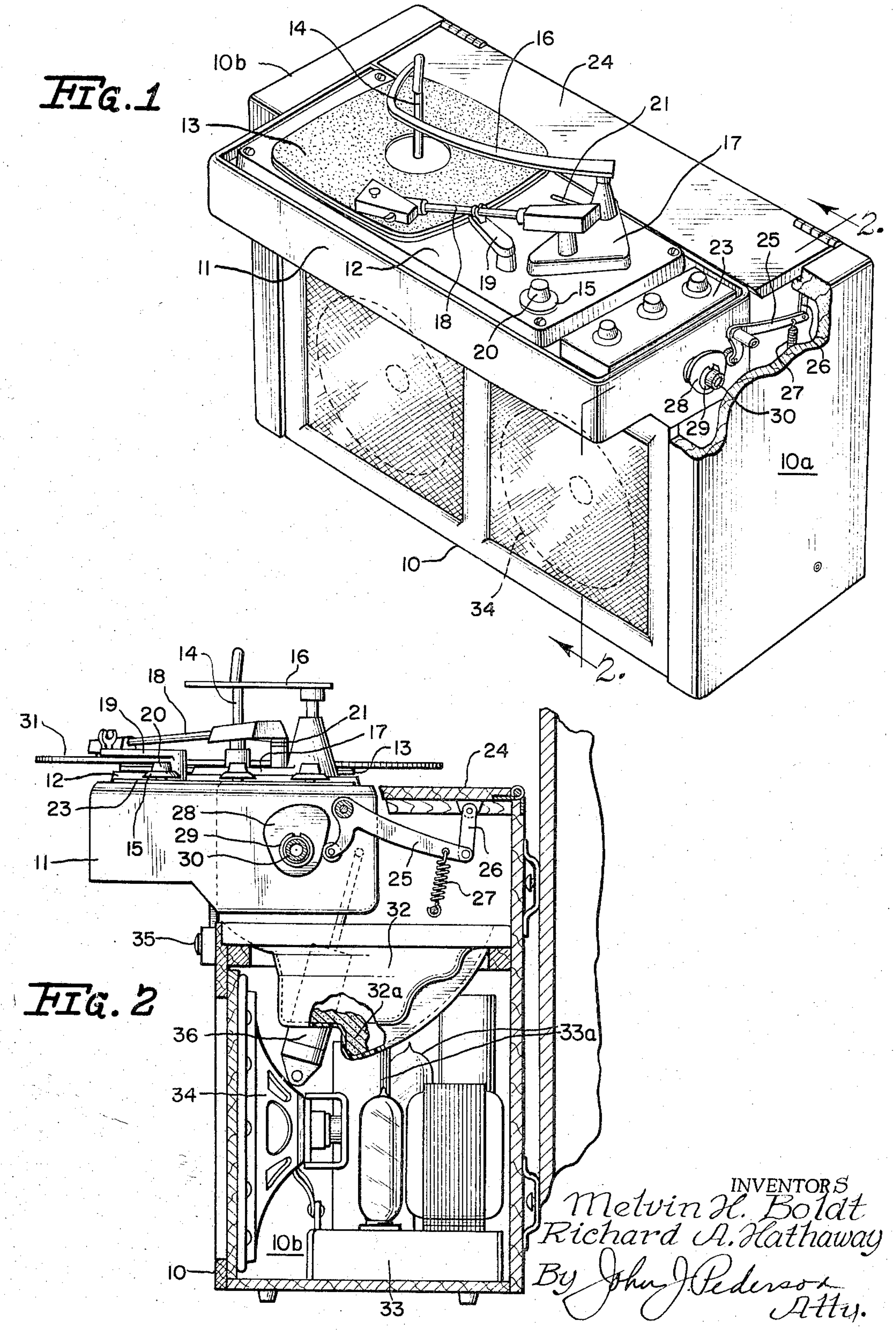
FIGURE 1 is a perspective view of a phonograph embodying the invention, partly broken away to show internal parts, in the open or playing configuration.
FIGURE 2 is a side-elevational view, partly in cross section and partly broken away, taken along line 2—2 of FIGURE 1.

Referring now more particularly to FIGURE 1, the embodiment there represented is a wall-mounted console phonograph incorporating an automatic record changer. The instrument has a two part housing or cabinet with a main portion 10 which houses the audio signal processing apparatus including an amplifier and one or more loudspeakers. If desired, the instrument may be provided with jacks or other provisions for accommodating remote speakers which may be cable-connected to the amplifier output. The unit may be designed for the reproduction of monaural or stereophonic records, as desired.

The second part of the housing consists of a subcabinet 11 for housing the record playing mechanism which may be of the simple single-play type or of the automatic record changing type as shown. A mounting plate 12 is affixed to subcabinet 11 for supporting the operating components of the record changer. Mounting plate 12 has characteristic dimensions less than those of subcabinet 11; preferably plate 12 is rectangular to conform in configuration to the cross section of subcabinet 11 and has overall dimensions slightly less than the internal subcabinet dimensions. If desired, an adjustable mounting may be employed to permit fastening of the mounting plate rigidly within the subcabinet when the instrument is being transported, with provision for loosening the mounting screws to achieve floating support of the mounting plate when the instrument is being used. This is a conventional practice in phonographs and record changers in high-fidelity console units; these mounting details constitute no part of the present invention and have not been shown in the drawings.

One of the principal components supported on the upper surface of mounting plate 12 is a turntable 13 which, for optimum compactness in the preferred embodiment of the invention, is of the type described and claimed in a copending application of Maurice E. Hardy, Serial No. 304,116, filed August 23, 1963, and assigned to the same assignee as the present application. Turntable 13 is an approximately square unitary plate having a centrally located aperture for receiving a record spindle 14, and having principal orthogonally related characteristic dimensions, e.g., width and length, which are approximately equal to the width dimensions of mounting plate 12 and subcabinet 11. The upper surface of turntable 13 is provided with a mat of a material, such as rubber, with a high coefficient of friction to avoid slippage of a record disc placed on the turntable during playing.

Turntable 13 may be driven from a circular depending flange by a drive wheel connected to a motor as described in the above-identified copending Hardy application. Mechanical and operating details of the mechanism for changing records may be completely conventional and constitute no part of the present invention. It, therefore, has not been deemed necessary to show any more of that mechanism that appears upon observation of the phonograph in the open or playing configuration. In brief, the record spindle 14, which projects from the central aperture of turntable 13, is of the record storing and feeding type with a shelf section near its upper extremity upon which a stack of records, threaded over the free end of the spindle, may rest, waiting to be fed one at a time to the turntable. A pressure arm 16 is pivotally supported from an outboard stanchion 17 for bearing on the uppermost record of a stack to retain the records in position on the shelf, in the conventional manner.

There is a tone arm 18 which is conventionally supported for pivotal motion in both horizontal and vertical planes from structures that are also accommodated by stanchion 17. A rest post 19 which is pivotally supported for angular displacement between a rest position outboard of the turntable (see FIGURE 9) and a storage position (shown in FIGURE 1) in which tone arm 18 is captivated in a position overlying and spaced from the turntable, as disclosed and claimed in the copending application of Richard A. Hathaway, Serial No. 304,117, filed August 23, 1963, for Phonographs, assigned to the same assignee as the present application and now issued as Patent No. 3,244,422. More particularly, rest post 19 comprises a lever arm pivotally mounted on a bearing sleeve affixed to mounting plate 12 outboard of the turntable near stanchion 17. The rest post is pivotally mounted for movement between two detented positions. In the first or playing position, the rest post is outboard and clear of the turntable and collinear with tone arm 18 for receiving the tone arm as it assumes its rest position. In the second or storage position, the rest post is overlying the turntable with tone arm 19 captivated in a position over the turntable, as shown in FIGURE 1. With rest post 19 in its second or storage position, turntable 13 is oriented with its sides approximately parallel to the sides of subcabinet 11 and is locked against motion in the manner fully described in the above-identified Hathaway application.

There are the customary two controls on the mounting plate; one the manual speed selector and the other an on-off cycling switch. They are shown as concentrically arranged with an outer knob 15 as a speed selector and an inner knob 20 as the on-off cycle switch.

Also projecting upwardly from stanchion 17 is a conventional flag or sensing device 21 that conditions the record changer and its control of the tone arm in accordance with the diameter of the record to be played.

Also mounted on subcabinet 11 adjacent to mounting plate 12 is the amplifier control panel 23 which contains the controls necessary to activate and adjust the amplifier and speaker outputs.

Part of main cabinet portion 10 consists of a door 24 which, when in its closed position, as shown, is flush with the upper surface of cabinet base 10. A mechanism for opening door 24 in response to the transferring of the phonograph from its open to its closed configuration, or vice versa, is revealed by the cut-away portion of side panel 10*a*. This mechanism includes a generally L-shaped arm 25 which is pivotally mounted to panel 10*a* at the elbow of the arm, and an opening arm 26 pivotally affixed to arm 25 near the extreme end of its longer member. Opening arm 26 is pivotally affixed to door 24. A biasing spiral spring 27 affixed to arm 25 and to side panel 10*a* serves to urge arm 25 and door 24 toward its closed position. A cam 28 is rigidly attached to subcabinet 11 by being affixed to a shaft bearing sleeve 29 which in turn is rigidly affixed to subcabinet 11. Arm 25 serves as a cam follower to cam 28 and may be provided with a small rotatable wheel, as shown, to decrease friction between the cam and cam follower. Sleeve 29 serves as a bearing sleeve for a hollow shaft 30. Shaft 30 is rigidly affixed to side panel 10*a* and extends into subcabinet 11 and forms a part of a turntable and tone arm orienting and locking mechanism which will be described in connection with FIGURES 5 and 6. Together with sleeve 29, shaft 30 forms one of two pivotal mountings of subcabinet 11 which mounting defines a horizontal pivotal axis located approximately one-quarter of the distance from the front to the rear panel of the main cabinet 10. Shaft 30 is hollow to allow passage of a cable, not shown in FIGURE 1, for carrying the electrical connections from the record playing mechanism and controls mounted on subcabinet 11 to the audio signal processing apparatus housed in main cabinet 10.

Referring now to FIGURE 2, the phonograph is there shown in side elevational view in its open or playing configuration. A record disc 31 is shown on turntable 13 with tone arm 18 tracking thereupon. A contoured partition 32 which provides a recess in the main cabinet for receiving the record changing and playing mechanism as that mechanism assumes its storage position, will be described in greater detail in connection with FIGURE 4. Partition 32 may be wholly or partially lined with a compressible shock-absorbent material 32*a*, such as foam rubber, to provide added protection for the playing components during storage.

Below partition 32 is the phonograph amplifier 33 which serves to amplify the audio signal produced by the record playing mechanism and to drive one or more speakers 34. Amplifier 33 and speakers 34 may be of an entirely conventional construction and it therefore has not been deemed necessary to describe them in detail. Amplifier 33 is shown with components 33*a* which may be vacuum tubes, transformers, or other electronic devices such as are found in ordinary phonograph amplifiers.

Figures 3, 4, 5, 6, 7:
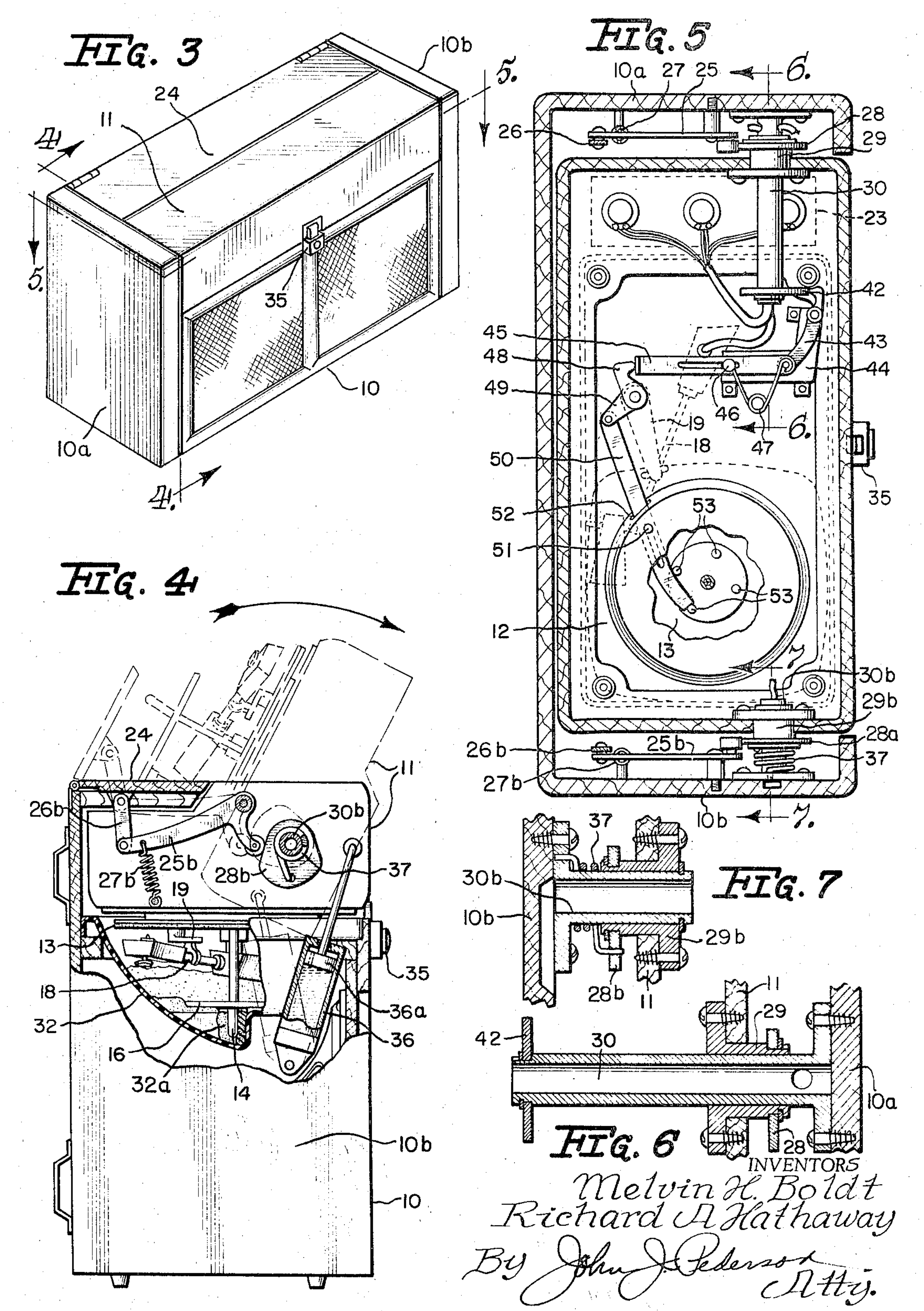
FIGURE 3 is a perspective view of the phonograph of FIGURE 1 in the closed or stored position.
FIGURE 4 is a side-elevational view, partly broken away and partly in cross section, taken along line 4—4 of FIGURE 3, illustrating the manner in which the unit is conditioned for operation.
FIGURE 5 is a plan view, partly in cross section and partly broken away, taken along line 5—5 of FIGURE 3.
FIGURE 6 is a fragmentary view, partly in cross section, taken along line 6—6 of FIGURE 5.
FIGURE 7 is a fragmentary view, partly in cross section, taken along line 7—7 of FIGURE 5.

A push button detent or catch 35 which may be of entirely conventional construction is provided on the front panel of base portion 10 for securing subcabinet 11 in its closed configuration as shown in FIGURE 3. Also shown in FIGURE 2 is a dashpot 36 which serves to damp the motion of subcabinet 11 between its open configuration and its closed configuration. The dashpot, which may be of the conventional cylinder and piston construction, is pivotally affixed to side panel 10*b* and to subcabinet 11.

In FIGURE 3 the phonograph is shown in its closed configuration in which the mounting plate and turntable, in accordance with the invention, are stored upside down within the recess of the main cabinet. In this configuration the record playing mechanism comprising turntable 13, spindle 14, and tone arm 18 is inverted within the cabinet. In a preferred embodiment of the invention, the primary dimensions of the phonograph in the closed configuration as shown in FIGURE 3 are approximately 8 inches in depth, 17 inches in height and 22 inches in width. These dimensions represent a compactness in size that is a major advantage of the invention. It is to be noted that when in the open and playing configuration shown in FIGURE 2, the phonograph may receive and play 12″ long-playing records even though it is wall mounted and only 8″ in depth while in the storage configuration of FIGURE 3.

Referring now to FIGURE 4, the view there presented illustrates the pivotal mounting of subcabinet 11 and shows how the record playing unit is swiveled into playing position. The storage configuration of the phonograph is shown in solid lines and an intermediate position is shown in dashed lines. Dashpot 36 is shown partially in cross-section to reveal the piston 36*a* seated in the cylinder which may be filled with oil in the usual construction. Subcabinet 11 is shown inverted with the record playing mechanism stored upside down near the phonograph's center of gravity and nested within the recess defined by the contoured partition 32. The components are partially nested in shock absorbent material 32*a* to increase the protection of these delicate components. Also shown in greater detail than in FIGURE 2 is the opening mechanism for door 24, comprising a generally L-shaped arm 25*b* pivotally affixed to side panel 10*b* at the elbow of the arm and an opening arm 26*b*, a spiral biasing spring 27*b* and a cam 28*b* rigidly affixed to subcabinet 11; a similar linkage is provided at the other end of subcabinet 11, as previously described.

A spiral restoring spring 37 urges the subcabinet 11 with the record playing mechanism toward the open or playing configuration. Spring 37 is wrapped around shaft 30*b*, which is fixed to side panel 10*b*, and has one end anchored to side panel 10*b* and the other end secured to cam 28*b*. Accordingly, spring 37 is increasingly compressed upon pivoting the subcabinet 11 from its open or playing position to its closed or storage position, thus minimizing or reducing the manual effort required to pivot subcabinet 11 in the manner indicated in dashed outline in FIGURE 4. Catch 35 serves to lock or detent subcabinet 11 in its closed position.

In FIGURE 5, a turntable orienting and locking mechanism is shown. The orienting and locking mechanism includes fixed shaft 30 which carries a cam 42 at its inner end. A cam follower 43 is pivotally affixed to a stand 44 mounted on subcabinet 11. Cam follower 43 is also pivotally affixed to a sliding member 45 which is captivated on stand 44 by means of a rivet or other fastener 46 which passes through an elongated guide slot member 45 so that the latter is free to reciprocate laterally as viewed in FIGURE 5. A wire spring 47 is provided for urging cam follower 43 against cam 42. Spring 47 is affixed between fastener 46 and the pivot pin on member 45 to which cam follower 43 is pivotally secured. Sliding member 45 is shown in contact with an arm 48 which is rigidly affixed to the pivot pin of rest post 19, shown in dotted outline. Also shown in dotted outline is tone arm 18 which is captivated by the saddle portion of rest post 19.

As described in the above identified copending Hathaway application, rest post 19 has a member 49 rigidly affixed to its depending pivot pin for advancing an orienting lever 50 to which it is pivotally attached. Orienting lever 50 is slidably captivated on mounting plate 12 by means of a rivet or pin 51 which passes through a gliding slot in lever 50. Lever 50 passes through an aperture 52 in mounting plate 12 which has a depression under turntable 13 to accommodate the turntable driving mechanism. Part of mounting plate 12 is shown broken away to reveal the underside of turntable 13. Orienting lever 50 is adapted to engage any of four stops 53 which depend from the underside of turntable 13. Each stop 53 is arranged equidistantly from the center of turntable 13 and equidistantly from the preceding and following stop. In traveling with turntable 13 the stops determine a circular path about the center of turntable 13. Orienting lever 50 and stops 53 are so arranged that when lever 50 assumes its storage position, as shown, it makes contact with two of stops 53, thereby locking turntable 13 in one of four predetermined positions. In each of these positions turntable 13 is oriented with its sides approximately parallel to the sides of subcabinet 11.

The conventional mechanisms for rotating and controlling turntable 13 and for changing records, as well as the electrical connections and controls thereof, have been omitted from FIGURE 5 in order to simplify the presentation of the turntable orienting and locking apparatus. Likewise dashpot 36 has been omitted to simplify the representation.

FIGURE 6 shows the pivotal mounting of subcabinet 11 in main cabinet 10 and the relationship between hollow shaft 30, which is rigidly affixed to side panel 10*a*, and bearing sleeve 29 which in turn is rigidly affixed to subcabinet 11. Shaft 30 is shown without the electrical connecting wires which pass through the hollow shaft and out through a side aperture near side panel 10*a*; these wires from control panel 23 and tone arm 18 are shown in FIGURE 5. The additional connecting wires for the turntable drive motor and record changing mechanism may be brought out in the same manner and have been omitted so as to simplify the presentation.

FIGURE 7 shows the other pivotal mounting of subcabinet 11, including a more detailed showing of spring 37 which is preferably strong enough to provide automatic conversion to the playing condition upon release of catch 35, although in some instances it may be desired to make spring 37 only strong enough to provide substantial assistance to manual conversion. Or, if desired for economy, spring 37 may be omitted altogether.

In operation, pressure arm 16 is swung in the counterclockwise direction to an extreme position to give free access to spindle 14 in order that one or more record discs may be threaded over it. The records are seated on the shelf of spindle 14. Thereafter, pressure arm 16 is returned to its position over spindle 14 to bear upon and stabilize the records thereon. If speed selector knob 15 is adjusted to the proper speed, and control knob 20 is manipulated, the record changer is turned on and a record change cycle initiated. This results in the lowermost record seated on the shelf of spindle 14 being delivered to turntable 13 after which tone arm 18 is set down in the first or lead-in groove of the record and the reproduction of the recording takes place in the usual manner. After the record has been played, tone arm 18 returns to its rest position and, if another record is on the shelf of spindle 14, a second record change cycle is instituted. This procedure is repeated until all the records placed on spindle 14 have been played. The instrument, if provided with an automatic shut-off mechanism, which is well known in the art, then shuts itself off. As thus far described, the operation is entirely conventional.

After the playing of the final record the tone arm 18 is in its rest position within the saddle of rest post 19, outboard of turntable 13 and overhanging the edge of subcabinet 11, and the record changer is turned off. In this condition, to prepare the record changing mechanism for storage the user pivotally displaces rest post 19, with tone arm 18 seated within it, to the detented storage position inboard of the turntable, as shown in FIGURE 1. To close the phonograph, the user then manually advances subcabinet 11 upward and about the pivotal axis formed by shafts 30 and 30*a*. As subcabinet 11 is thus pivoted, cams 28 and 28*b*, which are rigidly affixed to subcabinet 11, also rotate, thus moving pivot arms 25 and 25*b* which in turn advance arms 26 and 26*b* upward to open door 24, as shown in the dashed outline position of FIGURE 4. Cam 28 is especially shaped to open door 24 in such a manner as to allow the protruding parts of the record changing and playing mechanism to freely enter the recess within main cabinet 10.

As subcabinet 11 enters the recess, door 24 reaches an extreme position as shown in dashed outline in FIGURE 4 and then moves again toward its closed position. When subcabinet 11 has completed its movement and assumed its storage position, door 24 is retained in its closed position flush with the upper surface of the phonograph. The phonograph is then in the configuration shown in FIGURE 3.

In accordance with another feature of the invention, an automatic mechanism for orienting and locking turntable 13 from motion and securing tone arm 18 is provided. As subcabinet 11 is pivotally displaced about its pivotal axis cam 42 remains stationary within subcabinet 11. When in the open position with rest post 19 oriented outboard of turntable 13, cam follower 43 is in contact with the peripheral surface of cam 42, and reciprocating member 45 is displaced to the right of the position shown in FIGURE 5 and clear of lever 48.

As subcabinet 11 is pivotally displaced, cam follower 43 rides around the periphery of cam 42, being held in engagement therewith by spring 47. Cam 42 is contoured to have its maximum radius when the cabinet is closed and its minimum when the unit is opened to the playing position. Consequently, as subcabinet 11 is swung toward the closed position, reciprocating member 45 moves leftward (as viewed in FIGURE 5) into engagement with arm 48. Member 45 continues on, pivotally displacing arm 48 and with it, rest post 19 and arm 49. Arm 49, in turn, advances lever 50 through the path of stops 53, ultimately contacting one of these stops and advancing it and rotating turntable 13 until a second stop makes contact with the side of lever 50. The mechanism has at this juncture assumed the position shown in FIGURE 5, with the turntable oriented within the confines of subcabinet 11. Turntable 13 is now locked against rotation by the contact of two of stops 53 with lever 50 and tone arm 18 is secured within the saddle of rest post 19.

Cam 42 is of such a construction so as to advance cam follower 43 to its extreme position within the first 90 degrees of rotation of subcabinet 11 and to achieve nearly that extreme position in the first 45 degrees of rotation. With this construction the tone arm and turntable are oriented in the early part of the rotation of subcabinet 11, both to provide clearance for these components as the subcabinet enters the recess in main cabinet 10 and to prevent tone arm 18 from escaping from the saddle of rest post 19 during the closing operation.

To convert the phonograph from its storage configuration to its playing configuration, the user need only release catch 35 which is shown as a simple push button type of fastener. With catch 35 released, restoring spring 37 pivotally displaces subcabinet 11 about the horizontal axis defined by shafts 30 and **30*b*. As may best be envisioned by referring to FIGURE 4, cams 29 and 29*b* rotate, advancing arms 25 and 25*b* which in turn advance arms 26 and 26*b* to open door 24. Subcabinet 11 and door 24 are shown in an intermediate position in dashed outline in FIGURE 4. Dashpot 36 serves to damp and slow the movement of subcabinet 11, preventing damaging shocks or jars in the opening process. Subcabinet 11 continues its movement until assuming the open or playing position of FIGURE 1. With subcabinet 11 in its open position, door 24 is again flush with the upper surface of the phonograph. While subcabinet 11 is returning to its open position, cam follower 43 is withdrawing member 45 from contact with arm 48. The turntable remains in its orientation with its sides approximately parallel to the sides of subcabinet 11 and tone arm 18 remains captivated by rest post 19 inboard of turntable 13**.

To play a record the user must rotate rest post 19 to its detented outboard position, place a record on the spindle and operate the controls on panel 23 and knobs 15 and 20. When this is accomplished the phonograph will commence with the playing of the record in the conventional manner.

Figures 8, 9:
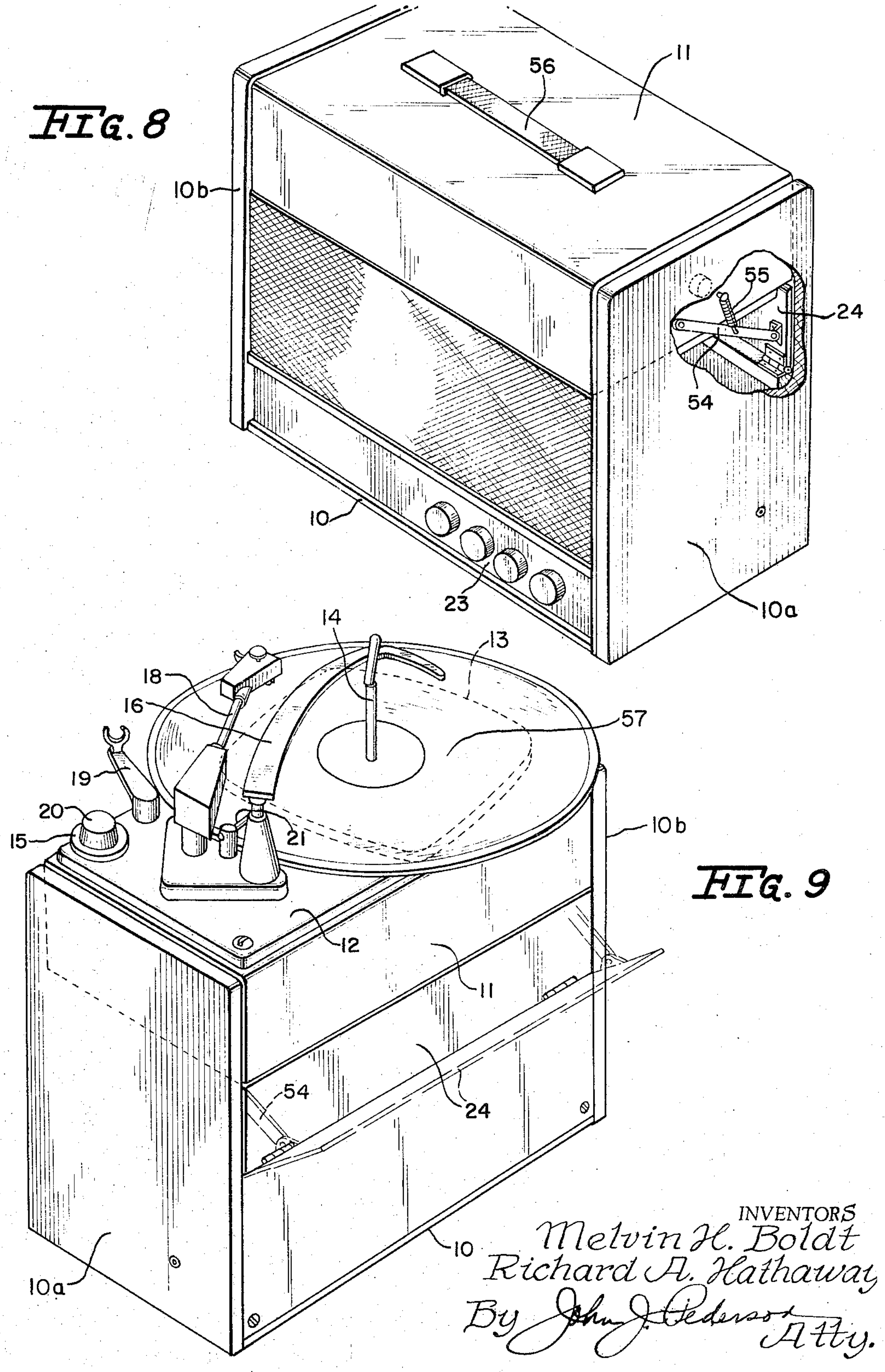
FIGURE 8 is a perspective view, in part broken away to show certain interior parts, of a phonograph also embodying the invention, in its closed or stored configuration.
FIGURE 9 is a perspective view of the phonograph of FIGURE 8 in its open or playing condition.

In FIGURE 8, the invention is embodied in a portable model phonograph having a main cabinet portion 10 for housing the audio signal processing apparatus including an amplifier and one or more speakers. Main cabinet 10 also carries a front-mounted amplifier and speaker control panel 23. Main cabinet 10 comprises right and left side panels **10*a* and 10*b* between which is mounted a subcabinet 11. The phonograph is shown in its closed or storage configuration in which the record playing mechanism is retracted upside down within a recess in main cabinet 10. Subcabinet 11 is pivotally mounted between panels 10*a* and 10*b* along a horizontal axis which is located at a point approximately half the distance from the front to the rear of the main cabinet 10. Part of panel 10*a* is shown broken away to reveal the mechanism for opening a door 24 on the back of main cabinet 10. This mechanism comprises an opening lever 54 pivotally mounted at both of its extremes respectively to door 25 and subcabinet 11. A biasing spring 55 is provided for urging door 24 toward its closed position flush with the back panel of base 10. Spring 55 is affixed to panel 10*a* and to lever 54 and rests in an area routed out of panel 10*a*. A second similar door opening mechanism may be provided at the opposite end of door 24 to assist the mechanism shown. For ease in carrying, the phonograph is provided with a handle 56 which is affixed on the bottom of subcabinet 11. When the phonograph is in its playing configuration, the handle is hidden from view within cabinet base 10**.

In FIGURE 9, the phonograph of FIGURE 8 is shown in its open or playing position playing a record 57. The playing mechanism is similar to the previous embodiment, including a mounting plate 12 and a turntable 13 of the type described and claimed in the above identified Hardy application. The tone arm 18 is shown tracking on record 57. A pressure arm 16, stanchion 17 and rest post 19 are provided, as are a flag or sensing device 21, and record playing control knobs 15 and 20. In all other respects, the unit of FIGURES 8 and 9 may be identical with that of the embodiment of FIGURES 1–7.

In operation the playing mechanism may operate in the same manner as the embodiment of FIGURES 1–7.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a phonograph having a record playing mechanism supported on a mounting plate and including components which overhang beyond said mounting plate under certain operating conditions, and further having apparatus for processing audio signals developed by said record playing mechanism from a record disc:

a cabinet having a main portion for housing said audio signal processing apparatus and having a recess at the top;

an auxiliary cabinet portion substantially filling said recess and having a first surface to which said mounting plate is affixed, and an opposite surface conforming to said main cabinet portion;

means pivotally securing said auxiliary cabinet portion to said main cabinet portion for rotation within said recess between a playing position in which said record playing mechanism is upwardly presented for playing of said record disc and a second position in which said opposite surface is upwardly presented and said record playing mechanism is stored upside down within said recess of said main cabinet;

said components also overhanging beyond said auxiliary cabinet portion under said certain operating conditions;

and means responsive to said rotation of said auxiliary cabinet portion from said first position to said second position for retracting any such overhanging components wholly within the confines of said auxiliary cabinet portion.

2. In a phonograph having a record playing mechanism including a turntable of predetermined different maximum and minimum transverse dimensions for developing an audio signal from a record disc and further having apparatus for processing said audio signal to reproduce the sound recorded on said disc:

a cabinet having a main portion for housing said audio signal processing apparatus and having a recess;

an auxiliary cabinet portion, of a width intermediate said minimum and maximum transverse dimensions of said turntable, carrying said record playing mechanism and pivotally affixed to said main cabinet portion for rotation within said recess between a first position in which said record playing mechanism is upwardly presented for playing of said record disc and a second position in which said record playing mechanism is stored upside down within said recess of said main cabinet portion;

and means responsive to said rotation of said auxiliary cabinet portion from said first position to said second position for orienting and locking said turntable in a position wholly within the confines of said auxiliary cabinet portion.

3. In a phonograph having a record playing mechanism for developing an audio signal from a record disc and apparatus for processing said audio signal to reproduce the sound recorded on said disc;

a cabinet having a main portion for housing said audio signal processing apparatus and having a recess;

an auxiliary cabinet portion carrying said record playing mechanism and pivotally affixed to said main cabinet portion for rotation within said recess between a first position in which said record playing mechanism is upwardly presented for playing of said record disc and a second position in which said record playing mechanism is stored upside down within said recess of said main cabinet portion;

a door adjacent said recess and hinged to said main cabinet portion;

and means responsive to said rotation of said auxiliary cabinet portion for opening said door to provide clearance for said record playing mechanism during said rotation, and for reclosing said door to completely enclose said recess when said auxiliary cabinet portion is in both said first and second positions.

4. In a phonograph having a record playing mechanism for developing an audio signal from a record disc and a main chassis provided with apparatus for processing said audio signal to reproduce the sound recorded on said disc:

a cabinet having a main portion for housing said main chassis and having a recess;

an auxiliary cabinet portion carrying said record playing mechanism;

means including a pair of coaxial hollow shafts fixed to said main cabinet portion on opposite sides of said recess and a pair of hollow sleeves fixed to said auxiliary cabinet portion and journalled on said shafts for permitting rotation of said auxiliary cabinet portion within said recess between a first position in which said record playing mechanism is upwardly presented for playing of said record disc and a second position in which said record playing mechanism is stored upside down within said recess of said main cabinet portion;

and electrical connecting wires extending through at least one of said hollow shafts for interconnecting said record playing mechanism and said main chassis.

References Cited by the Examiner

UNITED STATES PATENTS

| | | | |
|---|---|---|---|
| 3,167,314 | 1/1965 | Bentsen | 274—1.7 X |
| 3,188,093 | 6/1965 | Meyer | 274—1.7 X |

FOREIGN PATENTS

| | | |
|---|---|---|
| 516,331 | 12/1920 | France. |
| 445,613 | 6/1927 | Germany. |
| 334,556 | 9/1930 | Great Britain. |
| 112,037 | 10/1925 | Switzerland. |

NORTON ANSHER, *Primary Examiner.*

CLIFFORD B. PRICE, *Examiner.*